(12) United States Patent
Malamud

(10) Patent No.: US 6,412,838 B1
(45) Date of Patent: Jul. 2, 2002

(54) CARRIER FOR A FRAMED CANVAS

(76) Inventor: Sean Malamud, 9802 Sherwood Farm Rd., Owings Mills, MD (US) 21117

( * ) Notice: Subject to any disclaimer, the term of this patent is extended or adjusted under 35 U.S.C. 154(b) by 0 days.

(21) Appl. No.: 09/634,294

(22) Filed: Aug. 9, 2000

(51) Int. Cl.$^7$ ................................................ B65G 7/12
(52) U.S. Cl. ........................................................ 294/15
(58) Field of Search ............................ 294/15, 26, 17, 294/27.1, 32, 137, 149, 151, 153, 157

(56) References Cited

U.S. PATENT DOCUMENTS

| | | | | |
|---|---|---|---|---|
| 360,672 | A | * 4/1887 | Pertig | 294/27.1 |
| 728,450 | A | 5/1903 | Everett | 294/162 |
| 941,212 | A | 11/1909 | Tolman | 294/162 |
| 1,133,310 | A | * 3/1915 | Nash | 294/15 |
| 1,456,861 | A | 5/1923 | Anderson | 294/166 |
| 1,985,571 | A | 12/1934 | Hetzel | 294/137 |
| 2,271,901 | A | 2/1942 | Smith et al. | 294/26 |
| 2,430,142 | A | * 11/1947 | Roberts | 294/26 |
| 2,780,486 | A | 2/1957 | Loughlin | 294/34 |
| 2,969,607 | A | 1/1961 | Grumbacher | 248/456 |
| 3,281,031 | A | 10/1966 | Shapiro | 294/16 |
| 3,301,452 | A | 1/1967 | Jester | 294/137 |
| 3,563,432 | A | 2/1971 | Sage | 294/146 |
| 4,081,119 | A | 3/1978 | Messmore | 206/454 |
| 4,156,498 | A | 5/1979 | Miller | 294/151 |
| D255,317 | S | * 6/1980 | Slinkard | 294/15 |
| 4,446,968 | A | 5/1984 | Bremer | 16/410 |
| 4,493,504 | A | 1/1985 | MacHose | 294/146 |
| D288,276 | S | * 2/1987 | Harney | 294/15 |
| 4,695,085 | A | * 9/1987 | Cassels | 294/26 |
| 4,858,309 | A | * 8/1989 | Korsunsky et al. | 294/15 |
| 4,953,904 | A | 9/1990 | Danboise | 294/15 |
| 5,257,843 | A | * 11/1993 | Nunn | 294/15 |
| 5,326,147 | A | 7/1994 | Watson | 294/137 |
| D349,437 | S | * 8/1994 | Mock et al. | 294/15 |
| 5,397,158 | A | 3/1995 | Brass et al. | 294/16 |
| 5,425,562 | A | * 6/1995 | Balwin | 294/15 |

OTHER PUBLICATIONS p. 46, "The Protector" wet canvas carrier, catalog item No. 32501, in The Jerry's Catalog, Cat. No. 43B, for May 11, 1996 thru Sep. 10, 1996, published by Jerry's Artarama, in North Carolina.

* cited by examiner

Primary Examiner—Dean J. Kramer
Assistant Examiner—Paul T. Chin
(74) Attorney, Agent, or Firm—Marvin S. Towsend

(57) ABSTRACT

A carrier apparatus is provided for a framed canvas and includes a frame carrier portion which includes a first carrier riser. A transverse carrier floor is connected to the first carrier riser, and a second carrier riser is connected to the transverse carrier floor. A handle portion includes a handle riser connected to the second carrier riser and includes a transverse grasp member connected to the handle riser. The transverse grasp member includes a first open channel and a second open channel. The use of a pair of handle risers is preferred. The first carrier riser includes a tapered wall which has a top wall thickness and a bottom wall thickness. The bottom wall thickness is greater than the top wall thickness. As a result, the first carrier riser tapers from the transverse carrier floor to the top of the first carrier riser. The first carrier riser has a first riser height, and the transverse carrier floor has a floor width. The second carrier riser has an offset bend, which bends away from the first carrier riser, for connecting to the handle riser. An annular handle-to-handle connector is received in the first open channel and projects out from a backside of the transverse grasp member. The annular handle-to-handle connector is capable of being received in a second open channel of another transverse grasp member of another carrier apparatus.

2 Claims, 7 Drawing Sheets

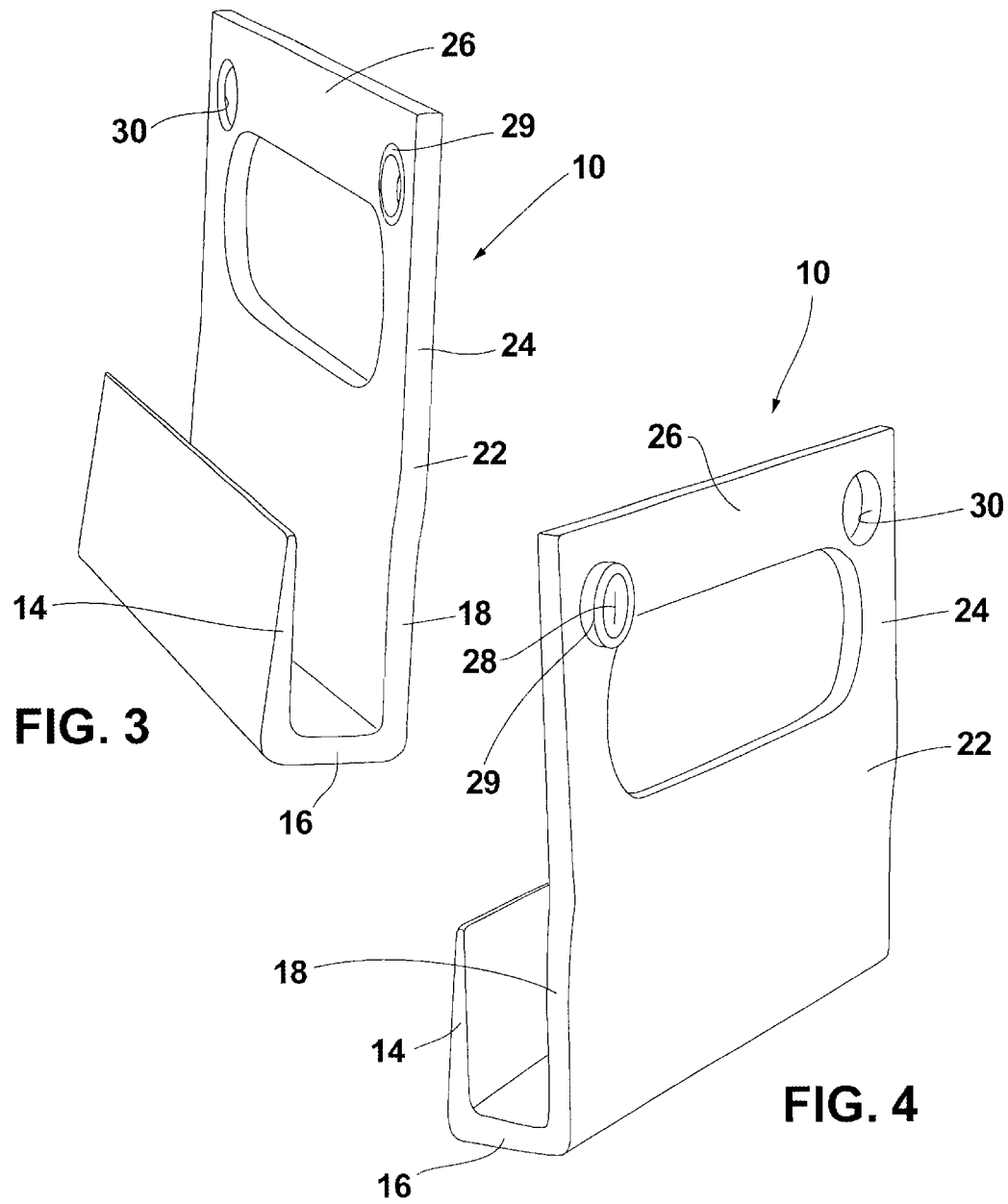

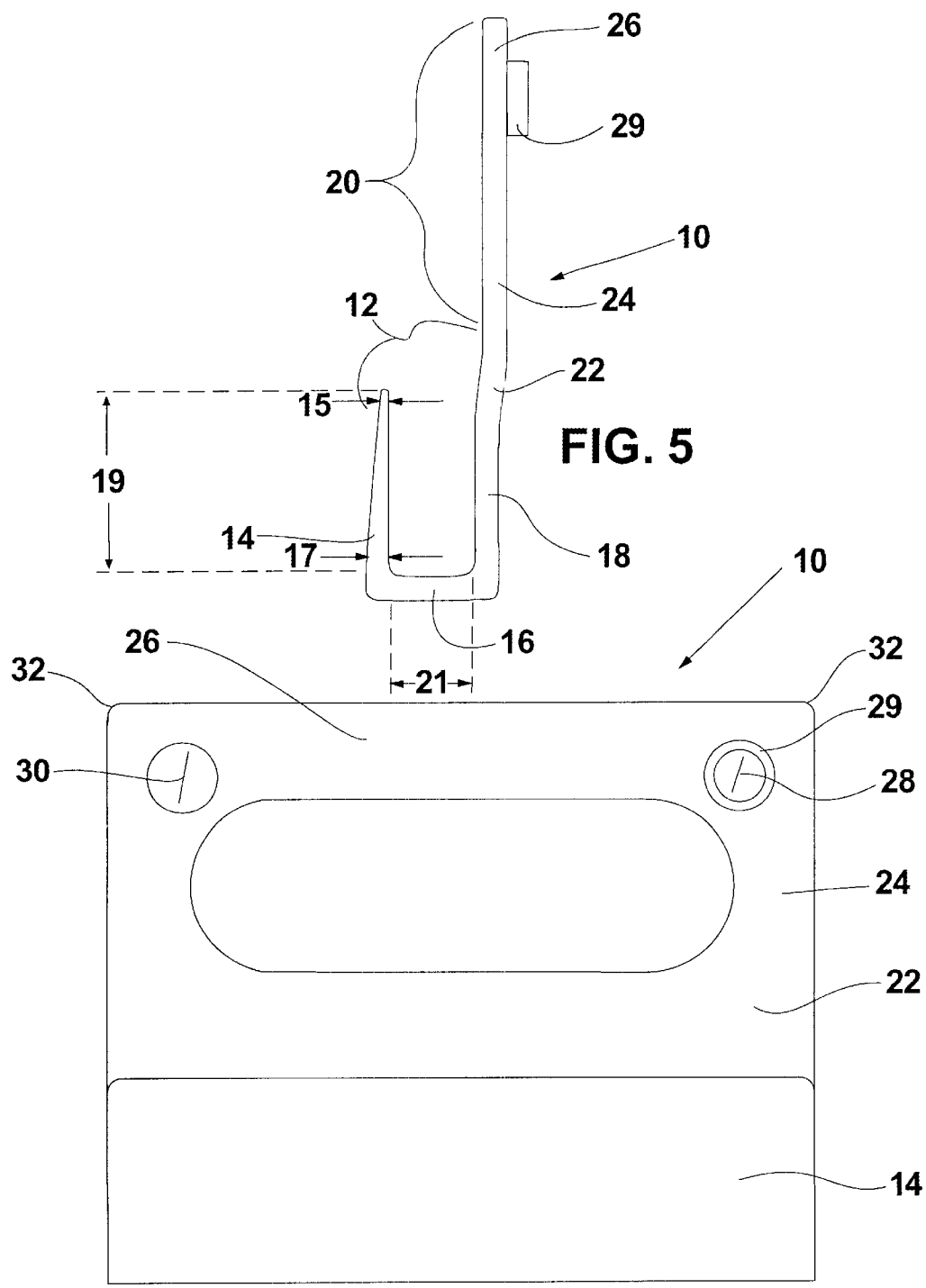

CARRIER FOR A FRAMED CANVAS

BACKGROUND OF THE INVENTION

1. Field of the Invention

The present invention relates generally to hand-held carriers for articles and, more particularly, to a hand-held carrier especially adapted for carrying an artist's framed canvas.

2. Description of the Prior Art

A painting created by an artist is often on a canvas that is retained on a frame. Such a framed canvas is often rather large and bulky. Also, a framed canvas may have a wet front or top canvas portion. Moreover, the frame portion of the framed canvas generally does not have a handle or a means for grasping the frame portion. As a result, transporting a framed canvas from one place to another may require a person to use both hands to grasp the back and/or bottom of the frame so as not to damage the artistic content of the canvas. This problem is compounded when two framed canvases have to be carried and transported.

Throughout the years, a number of innovations have been developed relating to hand-held carriers for carrying framed canvases, and the following U. S. patents are representative of some of those innovations: U.S. Pat. Nos. 728,450, 941,212, 1,456,861, 2,969,607, 3,281,031, 3,563,432, 4,081, 119, 4,156,498, 4,446,968, 4,493,504, 5,326,147. Another hand-held carrier for framed canvases is disclosed on page 46 as "The Protector"wet canvas carrier, catalog item number 32501, in The Jerry's Catalog, Cat. No. 43B, for May 11, 1996 thru Sep. 10, 1996, published by Jerry's Artarama, in North Carolina. More specifically, each of U.S. Pat. Nos. 728,450, 941,212, 1,456,861, 2,969,607, 3,563,432, 4,446, 968, and 5,326,147, and the "The Protector" in The Jerry's Catalog, discloses a carrier for framed canvases that includes clamping elements that clamp the canvas portions either on the front or top surfaces of the canvas portions. Such a clamping action may damage of the artistic content of a canvas, especially a wet canvas. In this respect, it would be desirable if a carrier for a framed canvas were provided that does not clamp either the front or top canvas surfaces of a framed canvas.

Each of U.S. Pat. Nos. 3,281,031, 4,081,119, 4,156,498, and 4,493,504 discloses a carrier for carrying plural framed canvases. These carriers are big and bulky. They are larger than the framed canvases which they carry. If they are used for carrying only one framed canvas, the portion of the weight of the carrier may be relatively large compared to the weight of the framed canvas. In these respects, it would be desirable if a carrier for one or two framed canvases were provided which is not larger than the framed canvases which they carry. It would also be desirable if a carrier for framed canvases were provided which is not big and bulky.

In addition, when a hand-held carrier that is designed for carrying two framed canvasses is used for carrying only one framed canvas, the user is burdened to carry the remainder of the carrier that is not being used. This may be a waste of both money and effort for one framed canvas to be carried by carrier that is designed to accommodate two framed canvasses.

Aside from patents for hand-held carriers that are specifically designed for carrying framed canvases, a number of U.S. patents have been issued for hand-held carriers that have been designed for carrying other articles, and the following U.S. patents are representative of those patents: U.S. Pat. Nos. 1,985,571, 2,271,901, 2,430,142, 2,780,486, 3,301,452, 4,953,904, and 5,397,158. More specifically, it is noted that each of the following of the just-mentioned patents discloses a generally J-shaped support which can be used for engaging the frame of a framed canvas: U.S. Pat. Nos. 1,985,571, 2,271,901, 2,430,142, 2,780,486, 4,953, 904, and 5,397,158. However, it is noted that a frame for a framed canvas often has a frame lip that extends outward from the main body of the frame. None of the patents mentioned above, either in this paragraph or in the preceding paragraphs, disclose means for accommodating or compensating for such a frame lip when a framed canvas is being carried. Without compensation for such a frame lip in a carrier, a carried framed canvas may undesirably tilt in such a carrier. Then, there would be a tendency for a tilting framed canvas to hit the leg of a person who is walking and carrying the framed canvas. To avoid such a result, it would be desirable if a carrier for a framed canvas were provided that includes a feature for compensating for a frame lip.

Still other features would be desirable in a carrier for a framed canvas. For example, when two framed canvases are to carried by one person, it would be desirable if the two framed canvases could be carried by one hand. To accomplish this result, it would be desirable if a pair of framed canvas carriers were modular and could be easily used singly or as an interconnected pair. With such a modular pair of framed canvas carriers, one framed canvas could be carried by one independent framed canvas carrier in one hand, or two framed canvases could be carried by two interconnected framed canvas carriers in one hand. Each of the modular framed canvas carriers is small, lightweight and easily used with a framed canvas.

Another benefit of modular framed canvas carriers would be their small size and portability. Each modular carrier could be small enough to be carried in a person's pocket when not in use. Still, by interconnecting two modular carriers, two framed canvases could be carried by a small, non-bulky, lightweight carrier.

When two modular framed canvas carriers are employed, it would be desirable if keeping the two modular framed canvas carriers together would be an easy task. In this respect, it would be desirable if the mere grasping of the two modular framed canvas carriers for holding the two modular framed canvas carriers in one's hand serves to keep the two modular framed canvas carriers fastened together.

Another benefit that results from the use of modular framed canvas carriers is that there is a one-to-one correspondence between the number of carriers employed and the number of framed canvases carried. That is, one framed canvas is carried by one carrier; two framed canvases are carried by two carriers; three framed canvases are carried by three carriers; and four framed canvases are carried by four carriers.

Although the discussion thus far has been about hand-held framed canvas carriers, there are times when a person may desire to use a cord or strap and carry a framed canvas on one's shoulder. In this respect, it would be desirable if a framed canvas carrier were provided that permits carrying a framed canvas by hand or on one's shoulder.

Thus, while the foregoing body of prior art indicates it to be well known to use carriers for framed canvases, the prior art described above does not teach or suggest a carrier for a framed canvas which has the following combination of desirable features: (1) does not clamp either the front or top canvas surfaces of a framed canvas; (2) is not big and bulky; (3) is not larger than the framed canvases which they carry; (4) includes a feature for compensating for a frame lip; (5) is small enough to fit in the pocket of a user when the carrier is not in use; (6) provides a pair of framed canvas carriers that are modular and that can be easily used singly or as an interconnected pair; (7) provides that the grasping of two modular framed canvas carriers for holding the two modular framed canvas carriers in one's hand serves to keep the two modular framed canvas carriers fastened together; (8) provides a one-to-one correspondence between the number of carriers employed and the number of framed canvases carried; and (9) permits carrying a framed canvas by hand or on one's shoulder. The foregoing desired characteristics are provided by the unique carrier for a framed canvas of the present invention as will be made apparent from the following description thereof. Other advantages of the present invention over the prior art also will be rendered evident.

SUMMARY OF THE INVENTION

To achieve the foregoing and other advantages, the present invention, briefly described, provides a carrier apparatus for a framed canvas which includes a frame carrier portion which includes a first carrier riser having a planar outside surface and a planar inside surface, a transverse carrier floor connected to the first carrier riser, and a second carrier riser having a planar outside surface and a planar inside surface and connected to the transverse carrier floor. A handle portion includes a handle riser having a planar outside surface and a planar inside surface and connected to the second carrier riser and includes a transverse grasp member having a planar outside surface and a planar inside surface and connected to the handle riser. The transverse grasp member includes a first open channel and a second open channel. The respective planar outside surfaces and the respective planar inside surfaces are in substantially parallel planes. Also, the frame carrier portion and the handle portion are formed as a unitary structure. The use of a pair of handle risers is preferred.

The first carrier riser includes a tapered wall as a result of the planar outside surface of the first carrier riser converging toward the planar inside surface of the first carrier riser. In this respect, the first carrier riser has a top wall thickness and a bottom wall thickness. The bottom wall thickness is greater than the top wall thickness. Stated alternatively, the first carrier riser tapers from the transverse carrier floor to the top of the first carrier riser. The first carrier riser has a first riser height, and the transverse carrier floor has a floor width.

The second carrier riser has a first offset bend portion, which bends in a direction away from the first carrier riser, and has a second offset bend portion, connected to the first offset bend portion, which bends in a direction toward the first carrier riser, for connecting to the handle riser, such that the respective planar outside surfaces and the respective inside surfaces of the second carrier riser and the handle riser are in substantially parallel planes. An annular handle-to-handle connector is received in the first open channel and projects out from a backside of the transverse grasp member. The annular handle-to-handle connector is capable of being received in a second open channel of another transverse grasp member of another carrier apparatus.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is, therefore, an object of the present invention is to provide a carrier for framed canvases which does not clamp either the front or top canvas surfaces of a framed canvas.

Still another object of the present invention is to provide a carrier for a framed canvases that is not big and bulky.

Yet another object of the present invention is to provide a carrier for framed canvases which is not larger than the framed canvases which they carry.

Even another object of the present invention is to provide a carrier for framed canvases that includes a feature for compensating for a frame lip.

Still a further object of the present invention is to provide a carrier for framed canvases which is small enough to fit in the pocket of a user when the carrier is not in use.

Yet another object of the present invention is to provide a carrier for framed canvases that provides a pair of framed canvas carriers that are modular and that can be easily used singly or as an interconnected pair.

Still another object of the present invention is to provide a carrier for framed canvases which provides that the grasping of two modular framed canvas carriers for holding the two modular framed canvas carriers in one's hand serves to keep the two modular framed canvas carriers fastened together.

Yet another object of the present invention is to provide a carrier for framed canvases that provides a one-to-one correspondence between the number of carriers employed and the number of framed canvases carried.

Still a further object of the present invention is to provide a carrier for framed canvases that permits carrying a framed canvas by hand or on one's shoulder.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a front perspective view of the embodiment of the invention shown in FIGS. 1–2.

FIG. 4 is a rear perspective view of the embodiment of the invention shown in FIGS. 1–3.

FIG. 5 is an end view of the embodiment of the invention shown in FIGS. 1–4.

FIG. 6 is a front view of the embodiment of the invention shown in FIGS. 1–5.

DESCRIPTION OF THE PREFERRED EMBODIMENT

Figure 1:
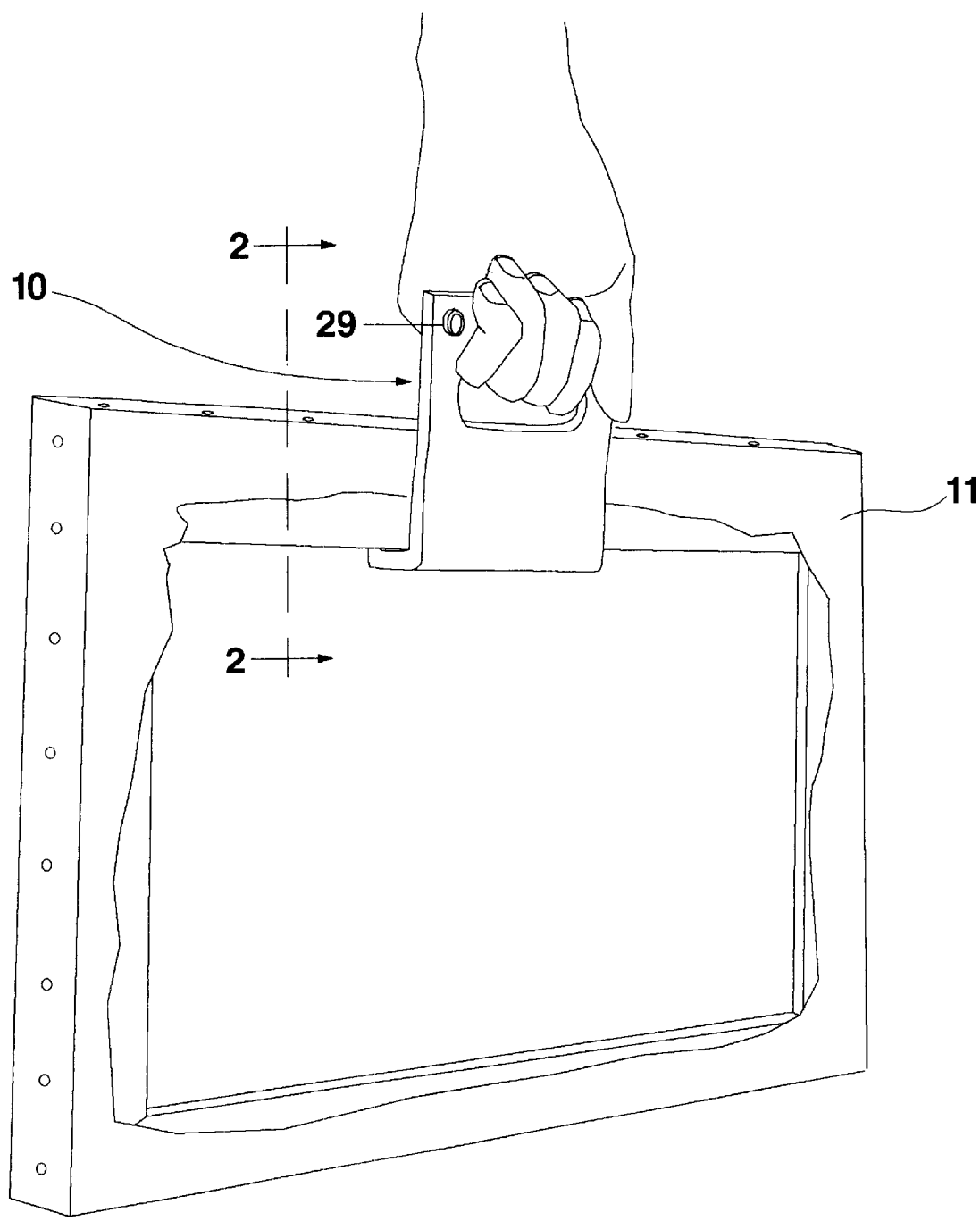
FIG. 1 is a perspective view showing a first embodiment of the carrier for a framed canvas of the invention in use carrying a single framed canvas.

With reference to the drawings, a carrier for a framed canvas embodying the principles and concepts of the present invention will be described.

Turning to FIGS. 1–6, an embodiment of the carrier apparatus for a framed canvas is generally designated by reference numeral 10. The carrier apparatus 10 includes a frame carrier portion 12 which includes a first carrier riser 14, a transverse carrier floor 16 connected to the first carrier riser 14, and a second carrier riser 18 connected to the transverse carrier floor 16. A handle portion 20 includes a handle riser 24 connected to the second carrier riser 18 and includes a transverse grasp member 26 connected to the handle riser 24. The transverse grasp member 26 includes a first open channel 28 and a second open channel 30. The use of a pair of handle risers 24 connected to end portions of a transverse grasp member 26 is preferred. The top corners of the transverse grasp member 26 can have rounded corners 32 such as shown in FIG. 6. The rounded corners 32 help prevent a canvas from being poked or damaged by top corners of the transverse grasp member 26. However, a single handle riser 24 connected to a central portion of a transverse grasp member 26 could also be employed.

The first carrier riser 14 includes a tapered wall which has a top wall thickness 15 and a bottom wall thickness 17. The bottom wall thickness 17 is greater than the top wall thickness 15. The thicker bottom wall thickness 17 provides added strength to the first carrier riser 14 and its connection to the transverse carrier floor 16. As a result, the first carrier riser 14 tapers from the transverse carrier floor 16 to the top of the first carrier riser 14. The first carrier riser 14 has a first riser height 19, and the transverse carrier floor 16 has a floor width 21.

The second carrier riser 18 has an offset bend 22, which bends away from the first carrier riser 14, for connecting to the handle riser 24. An annular handle-to-handle connector 29 is received in the first open channel 28 and projects out from a backside of the transverse grasp member 26. The annular handle-to-handle connector 29 is capable of being received in a second open channel 30 of another transverse grasp member 26 of another carrier apparatus.

The carrier apparatus 10 of the invention can be used in a number of ways. A first mode of use is shown in FIGS. 1 and 2.

The framed canvas 11 is on a frame 13 which has an inner frame lip 23, an outer frame lip 33, and a main frame body 27. The inner and outer frame lips 23 cumulatively with the main frame body 27 have a lip width 25. The main frame body 27 by itself has a body width 31. The lip width 25 is greater than the body width 31 so that the frame lips overhang on each side of the main frame body 27.

As shown in FIG. 1, the carrier apparatus 10 of the invention is small in comparison with the framed canvas 11 that it carries. In fact, it is small enough to fit into a person's conventional pocket when not in use.

Figure 2:
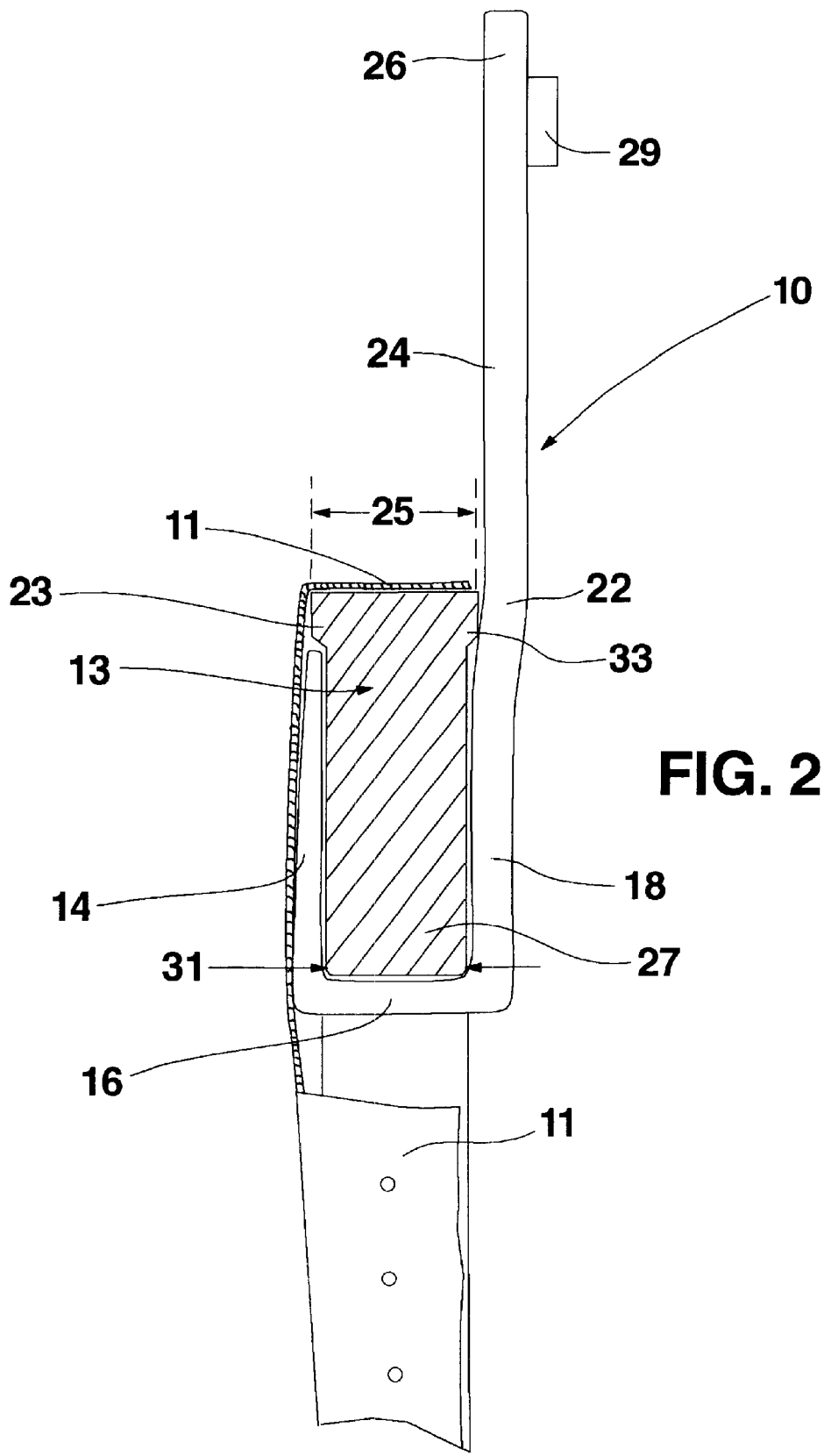
FIG. 2 is an enlarged cross-sectional view of the embodiment of the invention shown in FIG. 1 taken along line 2—2 thereof.

As shown in greatest detail in FIG. 2, when the carrier apparatus 10 of the invention is used for carrying a framed canvas 11 that has a frame 13 which has inner frame lip 23, the first carrier riser 14 is slipped between the back of the canvas 11 and the main frame body 27. Moreover, the first riser height 19 is less than the distance between the bottom of the main frame body 27 and the bottom of the inner frame lip 23. As a result, the top of the first carrier riser 14 fits under the overhang portion of the inner frame lip 23. In addition, the tapering of the first carrier riser 14 from the bottom wall thickness 17 to the top wall thickness 15 provides that the top of the first carrier riser 14 is approximately equal to the overhang distance of the inner frame lip 23. As a result, the top of the first carrier riser 14 is clear of the back of the framed canvas 11 so that the top first carrier riser 14 does not deform the canvas 11 when the carrier apparatus 10 of the invention is employed. Moreover, use of the carrier apparatus 10 in this way does not clamp either the front or top canvas surfaces of framed canvas 11.

Turning attention to the outer frame lip 33 and the vicinity thereof, the outer frame lip 33 extends toward the second carrier riser 18. With the invention, the offset bend 22 of the second carrier riser 18 extends away from the outer frame lip 33. As a result, when the framed canvas 11 is carried by the carrier apparatus 10 of the invention, the framed canvas 11 has a tendency to hang substantially vertically from the carrier apparatus 10. If the offset bend 22 of the invention were not provided, there would be a tendency of the framed canvas 11 to hang at an undesirable skew angle in the direction of the second carrier riser 18. With a framed canvas 11 hanging at a skew angle towards the second carrier riser 18, when a person would be carrying a framed canvas 11 in one's hand, there would be a tendency of the person's leg to hit or bump the framed canvas 11. The presence of the offset bend 22 of the invention reduces the tendency of hanging at a skew angle and reduces the tendency of a person's leg from hitting or bumping the framed canvas 11. Also, if the offset bend 22 were not present, when two modular framed canvas carriers would be used back to back to carry two framed canvases, there would be a tendency of the bottom portions of the two framed canvases to hit each other, resulting in a situation whereby the respective annular handle-to-handle connectors 29 and the second open channels 30 of the two modular carriers would not engage each other in a tight-fitting manner.

As shown in FIG. 1, a person is carrying the carrier apparatus 10 and the framed canvas 11 using a hand. A second mode of using the carrier apparatus 10 of the invention is also contemplated. That is, a rope or cord is threaded through the first open channel 28 and the second open channel 30. Then, the rope or cord can be extended over one of the person's shoulders. In this way, the person can carry the carrier apparatus 10 and the framed canvas 11 on one's shoulder. That is, a rope or cord is threaded through the first open channel 28 and the second open channel 30. Then, the rope or cord can be extended over one of the person's shoulders. In this way, the person can carry the carrier apparatus 10 and the framed canvas 11 on one's shoulder.

Figure 7:
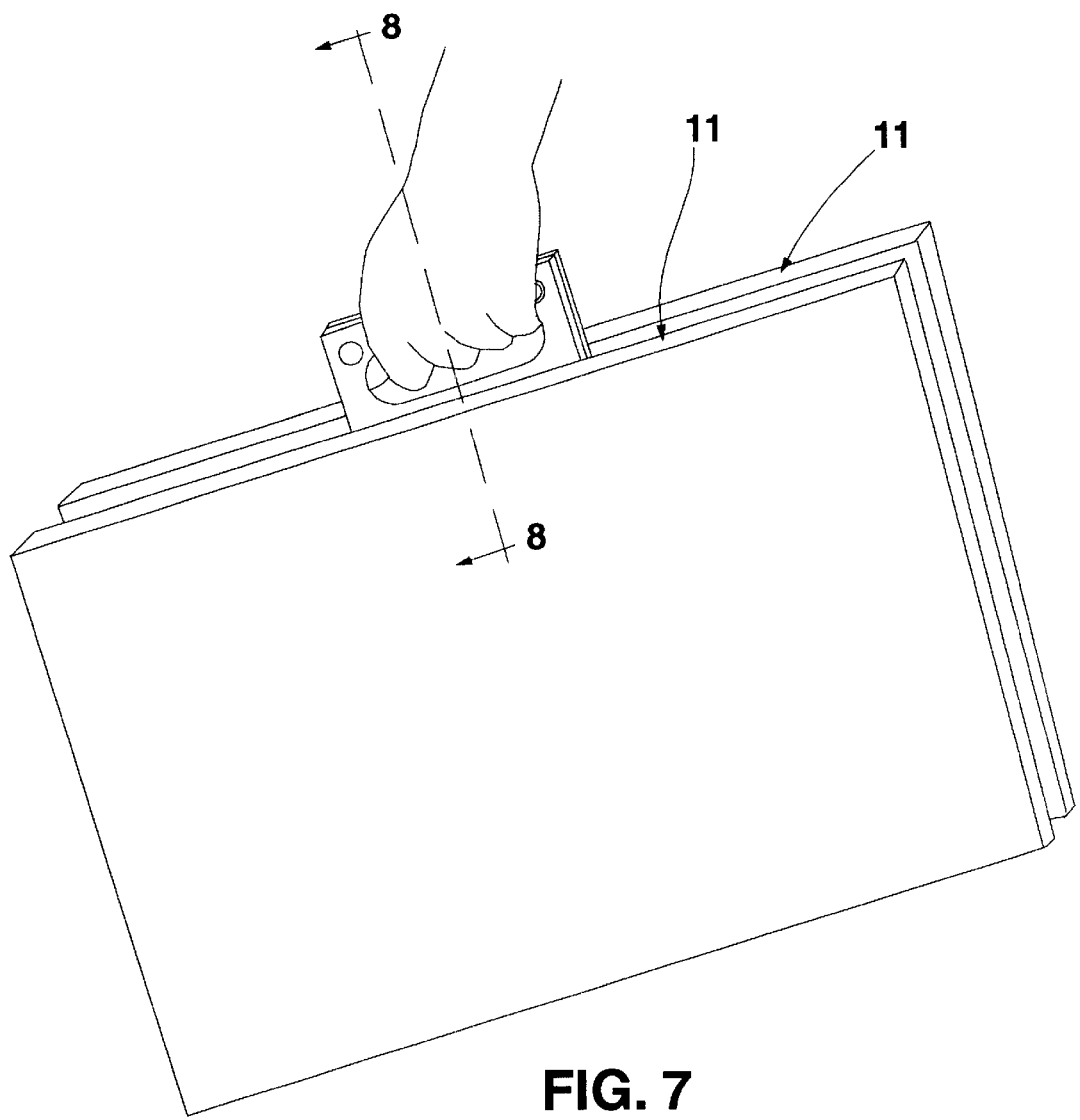
FIG. 7 is a perspective view showing a second embodiment of the invention in which two modular framed canvas carriers are employed back to back for carrying two framed canvases.
Figure 8:
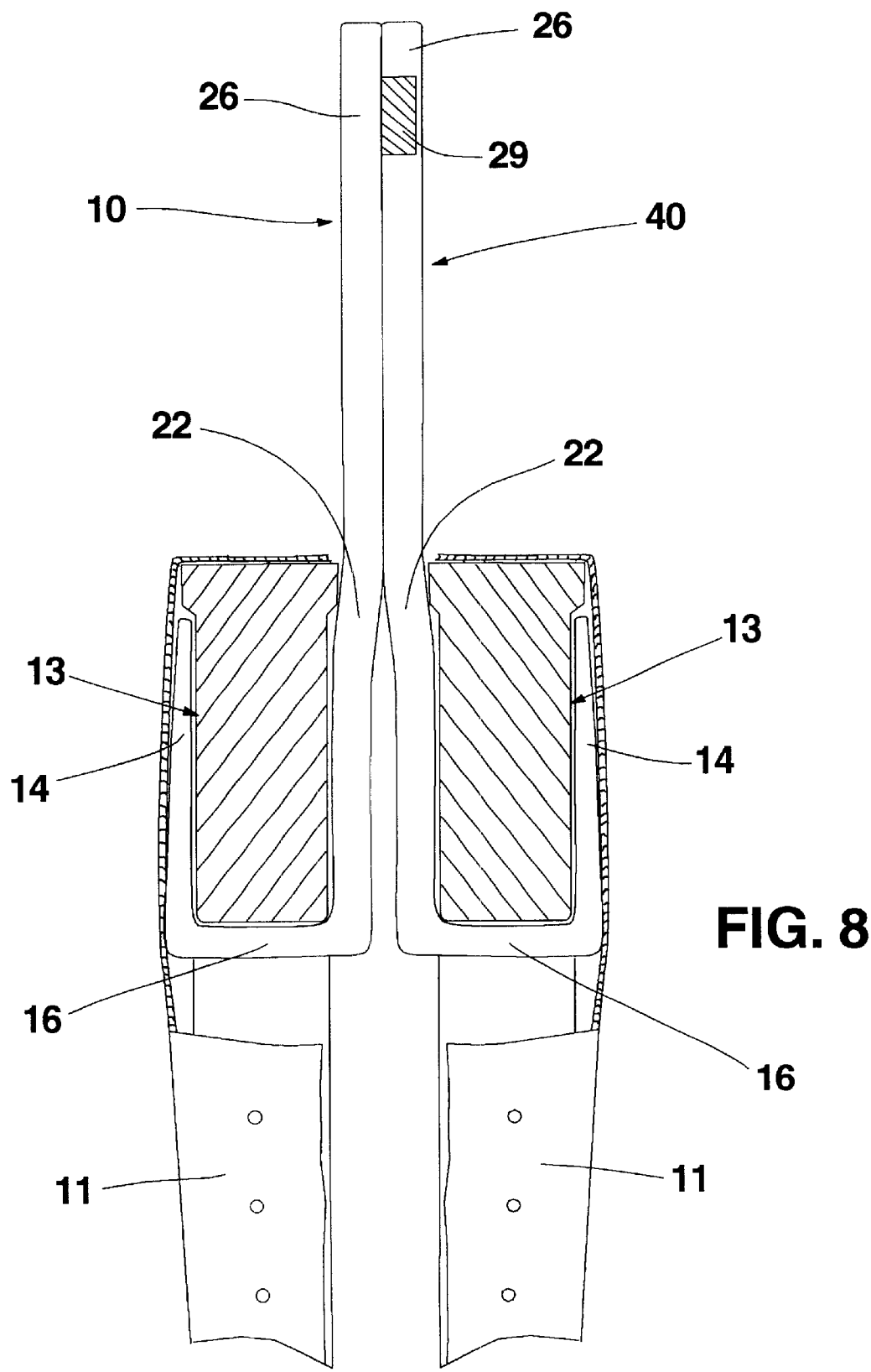
FIG. 8 is an enlarged cross-sectional view of the embodiment of the invention shown in FIG. 7.
Figure 9:
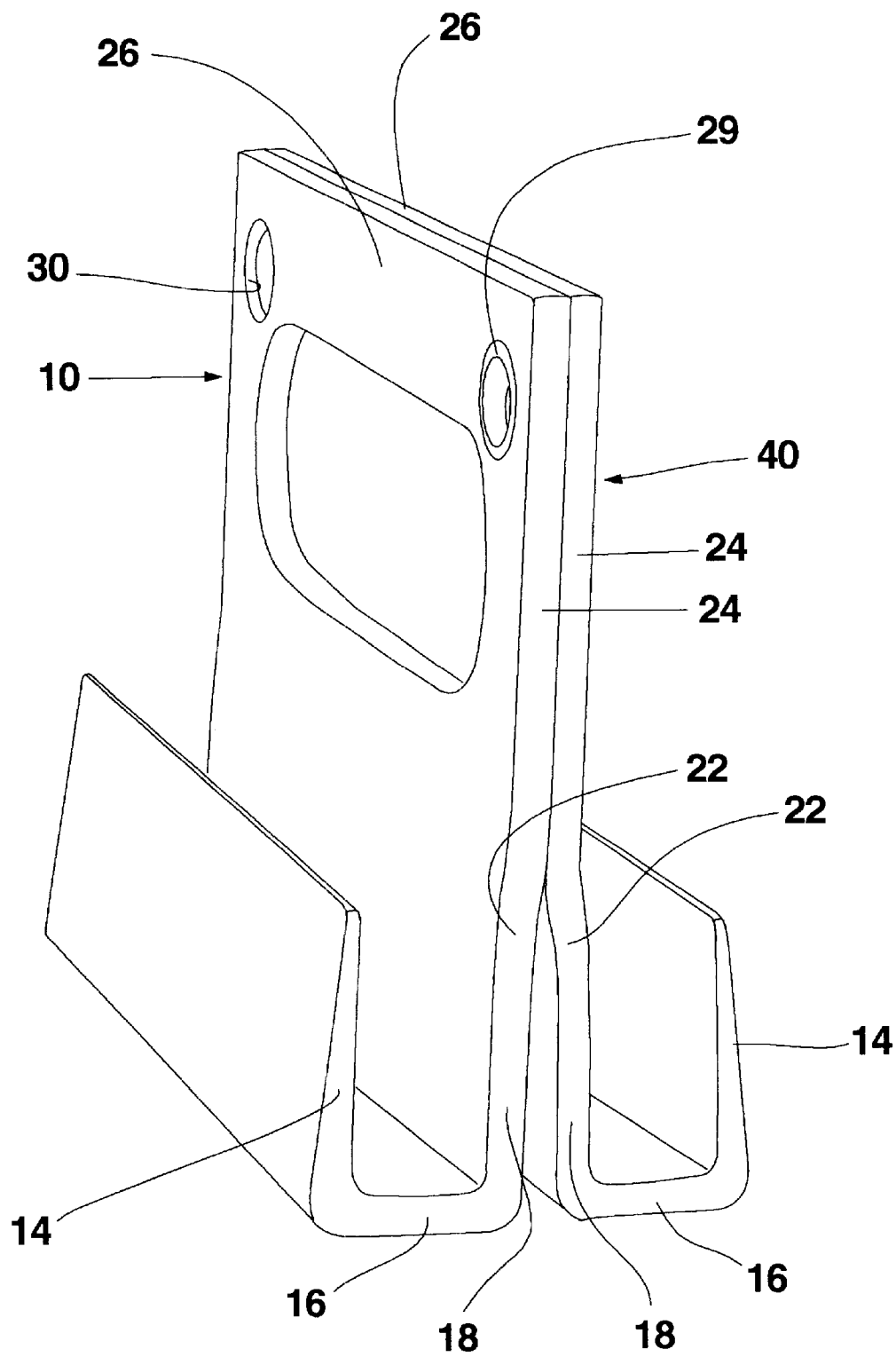
FIG. 9 is an enlarged perspective view of the embodiment of the invention shown in FIGS. 7–8.

A third mode of using the carrier apparatus 10 of the invention is shown in FIGS. 7 and 8. Here, two carrier apparatuses 10 of the invention are taken together, a first carrier apparatus 10 and a second carrier apparatus 40. Both the first carrier apparatus 10 and the second carrier apparatus 40 are identical in all respects. In this respect, they are modular, and they are placed back to back. Both the first carrier apparatus 10 and the second carrier apparatus 40 have their respective first open channel 28, annular handle-to-handle connector 29, and second open channel 30 located in the vicinity of their respective transverse grasp member 26. More specifically, the annular handle-to-handle connector 29 in the first carrier apparatus 10 is fit into the second open channel 30 in the second carrier apparatus 40. In addition, the annular handle-to-handle connector 29 in the second carrier apparatus 40 is fit into the second open channel 30 in the first carrier apparatus 10. In this mode of use, the transverse grasp member 26 of each of the back to back carrier apparatuses are in contact. Moreover, when a person grasps the two transverse grasp members 26, as shown in FIG. 7, the act of grasping the two transverse grasp members 26 forces the respective annular handle-to-handle connectors 29 into the respective second open channels 30 so that the two carrier apparatuses are secured to each other in their back to back arrangement.

As shown in the drawings, with the two carrier apparatuses in the back to back arrangement, a person can carry two framed canvases 11 with two carrier apparatuses in one hand. If such a pair of carrier apparatuses are carried in each hand, then the person can carry four framed canvases 11 with two hands.

A fourth mode of using the carrier apparatus 10 of the invention is also contemplated. That is, a rope or cord is threaded through the annular handle-to-handle connector 29 of the first carrier apparatus 10 and the second open channel 30 of the second carrier apparatus 40 which are in interengagement and is threaded through the annular handle-to-handle connector 29 of the second carrier apparatus 40 and the second open channel 30 of the first carrier apparatus 10 which are in interengagement. Then, the rope or cord can be extended over one of the person's shoulders. In this way, the person can carry two carrier apparatuses and two framed canvases 11 on one's shoulder.

If two shoulders are used with ropes or cords, the person can carry four carrier apparatuses with four framed canvases. Clearly with using the carrier apparatuses of the invention, there is a one-to-one correspondence between the number of carrier apparatuses used and the number of framed canvases carried.

The components of the carrier for a framed canvas of the invention can be made from inexpensive and durable plastic or metal materials. Plastic materials are preferred.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a carrier for framed canvases that is low in cost, relatively simple in design and operation, and which does not clamp either the front or top canvas surfaces of a framed canvas. With the invention, a carrier for framed canvases is provided which is not big and bulky. With the invention, a carrier for framed canvases is provided which is not larger than the framed canvases which they carry. With the invention, a carrier for framed canvases is provided which includes a feature for compensating for a frame lip. With the invention, a carrier for framed canvases is provided which is small enough to fit in the pocket of a user when the carrier is not in use. With the invention, a carrier for framed canvases provides a pair of framed canvas carriers that are modular and that can be easily used singly or as an interconnected pair. With the invention, a carrier for framed canvases provides that the grasping of two modular framed canvas carriers for holding the two modular framed canvas carriers in one's hand serves to keep the two modular framed canvas carriers fastened together. With the invention, a carrier for framed canvases provides a one-to-one correspondence between the number of carriers employed and the number of framed canvases carried. With the invention, a carrier for framed canvases is provided which permits carrying a framed canvas by hand or on one's shoulder.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by letters patent of the united states is as follows:

1. A carrier apparatus for a framed canvas, comprising:
    a frame carrier portion which includes a first carrier riser having a planar outside surface and a planar inside surface, a transverse carrier floor connected to said first carrier riser, and a second carrier riser having a planar outside surface and a planar inside surface and connected to said transverse carrier floor, and
    a handle portion connected to said second carrier riser, wherein said handle portion includes a handle riser having a planar outside surface and a planar inside surface and connected to said second carrier riser, wherein said handle portion includes a transverse grasp member having a planar outside surface and a planar inside surface and connected to said handle riser, and wherein said transverse grasp member includes a first open channel and a second open channel,
    an annular handle-to-handle connector received in said first open channel and which projects out from a backside of said transverse grasp member, wherein said annular handle-to-handle connector is capable of being received in a second open channel of another handle portion of another carrier apparatus,
    wherein said respective planar outside surfaces and said respective planar inside surfaces are in substantially parallel planes, and wherein said frame carrier portion and said handle portion are formed as a unitary structure.

2. A carrier apparatus for a framed canvas, comprising:

a frame carrier portion which includes a first carrier riser having a planar outside surface and a planar inside surface, a transverse carrier floor connected to said first carrier riser, and a second carrier riser having a planar outside surface and a planar inside surface and connected to said transverse carrier floor, wherein said first carrier riser includes a tapered wall having a top wall thickness and a bottom wall thickness, wherein said bottom wall thickness is greater than said top wall thickness, wherein said first carrier riser has a first riser height, and wherein said transverse carrier floor has a floor width, wherein said second carrier riser has a first offset bend portion, which bends away from said first carrier riser, and has a second offset bend portion, connected to said first offset bend portion, which bends toward said first carrier riser, handle portion which includes a handle riser having a planar outside surface and a planar inside surface, wherein said handle riser is connected to said second offset bend portion, such that said respective planar outside surfaces and said respective inside surfaces of said second carrier riser and said handle riser are in substantially parallel planes, wherein said handle portion includes a transverse grasp member having a planar outside surface and a planar inside surface and connected to said handle riser, and wherein said transverse grasp member includes a first open channel and a second open channel, and an annular handle-to-handle connector received in said first open channel and which projects out from a backside of said transverse grasp member, wherein said annular handle-to-handle connector is capable of being received in a second open channel of another transverse grasp member of another carrier apparatus, wherein said respective planar outside surfaces and said respective planar inside surfaces are in substantially parallel planes, and wherein said frame carrier portion and said handle portion are formed as a unitary structure.

* * * * *